US008041681B2

(12) United States Patent
Nguyen et al.

(10) Patent No.: US 8,041,681 B2
(45) Date of Patent: Oct. 18, 2011

(54) METHOD FOR PERFORMING A BACKUP BY QUERYING A BACKUP INFRASTRUCTURE

(75) Inventors: Lu Nguyen, San Jose, CA (US); John R. Paveza, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/350,935

(22) Filed: Jan. 8, 2009

(65) Prior Publication Data

US 2009/0112948 A1    Apr. 30, 2009

Related U.S. Application Data

(63) Continuation of application No. 10/888,712, filed on Jul. 9, 2004, now Pat. No. 7,493,349.

(51) Int. Cl.
*G06F 17/30* (2006.01)
(52) U.S. Cl. ................. 707/648; 707/640; 711/162
(58) Field of Classification Search .......... 707/609, 707/640, 648; 711/162
See application file for complete search history.

(56) References Cited

U.S. PATENT DOCUMENTS

| | | | |
|---|---|---|---|
| 5,890,165 A | 3/1999 | Boudrie et al. | |
| 6,374,302 B1 | 4/2002 | Galasso et al. | |
| 6,564,215 B1 | 5/2003 | Hsiao et al. | |
| 6,611,923 B1 * | 8/2003 | Mutalik et al. ............. | 714/4.1 |
| 7,383,287 B2 | 6/2008 | Ellison et al. | |
| 2005/0138173 A1 * | 6/2005 | Ha et al. ................... | 709/225 |
| 2005/0216788 A1 * | 9/2005 | Mani-Meitav et al. ...... | 714/6 |
| 2006/0010174 A1 | 1/2006 | Nguyen et al. | |

FOREIGN PATENT DOCUMENTS

| | | |
|---|---|---|
| JP | 4308943 | 10/1992 |
| JP | 4369745 | 12/1992 |
| JP | 5012089 | 1/1993 |
| JP | 8194638 | 7/1996 |
| JP | 2000347919 | 12/2000 |

OTHER PUBLICATIONS

Managing A Storage Array Using CIM Schema 2.7, Revision 0.14, Work-in-Progress Draft, Sep. 13, 2002, pp. 1-35, Storage Networking Industry Association, San Francisco.
"SNIA Storage Management Initiative Specification Version 1.0.1", Sep. 12, 2003, pp. 1-644, Storage Networking Industry Association, San Francisco.
"CIM Tutorial", Jun. 13, 2003, pp. 1-105, Distributed Management Task Force, Portland.

* cited by examiner

*Primary Examiner* — Belix M Ortiz
(74) *Attorney, Agent, or Firm* — David W. Victor; Konrad Raynes and Victor LLP

(57) ABSTRACT

One aspect of the invention is a method for backing up data. An example of the method includes querying a backup infrastructure to ascertain backup capabilities of the backup infrastructure. This example also may include broadcasting the capabilities of the backup infrastructure, wherein the capabilities are broadcasted by the backup infrastructure. This example also includes determining if the backup infrastructure supports a desired backup type. If the backup infrastructure supports a desired backup type, this example may also include performing a backup of data using the desired backup type.

3 Claims, 6 Drawing Sheets

METHOD FOR PERFORMING A BACKUP BY QUERYING A BACKUP INFRASTRUCTURE

RELATED APPLICATIONS

This patent application is a continuation of U.S. patent application Ser. No. 10/888,712, filed on Jul. 9, 2004, which patent application is incorporated herein by reference in its entirety.

BACKGROUND

1. Technical Field

The present invention relates to backing up information in a computing system. More particularly, some examples of the invention concern broadcasting available backup services and/or querying a backup infrastructure as part of a process for backing up data.

2. Description of Related Art

Important data is often stored in computing systems. Frequently, a backup copy of data is made to prevent data from being lost if data becomes corrupted. If data becomes corrupted, the data can be restored from the backup copy. Consequently, it is important to be able to reliably back up data.

In a typical backup implementation, a backup client obtains data that is to be backed up, for example data from a database, and sends the data to a backup server. The backup server then stores the data on a storage device, such as a hard disk drive or tape. To retrieve the backup copy of the data, the backup server obtains the data from the storage device and sends the data to the backup client.

In modern computing systems, operations for backing up and restoring data are very complex. For example, there are several different types of backups that may be performed. Different types of backups include, for example, full, incremental (which includes all data since the previous incremental backup), differential (which includes all data since the previous full backup), copy (wherein the database does not truncate logs), LAN-free (which is over Fibre Channel), serverless (which bypasses the server such that data is sent directly from a host to a backup storage device), third party (wherein the data is sent directly from a host storage device to a backup storage device), and snapshot (wherein a copy of a file is saved before the file is updated).

Complex backup and restore operations often require 50% or more of a database administrator's time. Further, the complexity increases when backup types such as snapshot, LAN-free, serverless, and third party copy, for example, are utilized. Due to this complexity, there is a significant chance that an administrator will make a mistake that jeopardizes valuable data. Although there are known techniques for automating some backup operations, these automation techniques require a substantial amount of human intelligence, planning, and monitoring. Consequently, known techniques for backing up data are often inadequate.

SUMMARY

One aspect of the invention is a method for backing up data. An example of the method includes querying a backup infrastructure to ascertain backup capabilities of the backup infrastructure. This example also may include broadcasting the capabilities of the backup infrastructure, wherein the capabilities are broadcasted by the backup infrastructure. This example also includes determining if the backup infrastructure supports a desired backup type. If the backup infrastructure supports a desired backup type, this example may also include performing a backup of data using the desired backup type.

Other aspects of the invention are described in the sections below, and include, for example, a computing system, and a signal bearing medium tangibly embodying a program of machine-readable instructions executable by a digital processing apparatus to perform operations for backing up data.

Some examples of the invention advantageously permit application programs and databases to backup themselves by querying the backup infrastructure. Further, some examples of the invention simplify performing backup operations and require very little administrator's time. Also, some examples of the invention beneficially permit a user to change a backup infrastructure without affecting backup processes. The invention also provides a number of other advantages and benefits, which should be apparent from the following description.

DETAILED DESCRIPTION

Figure 1:
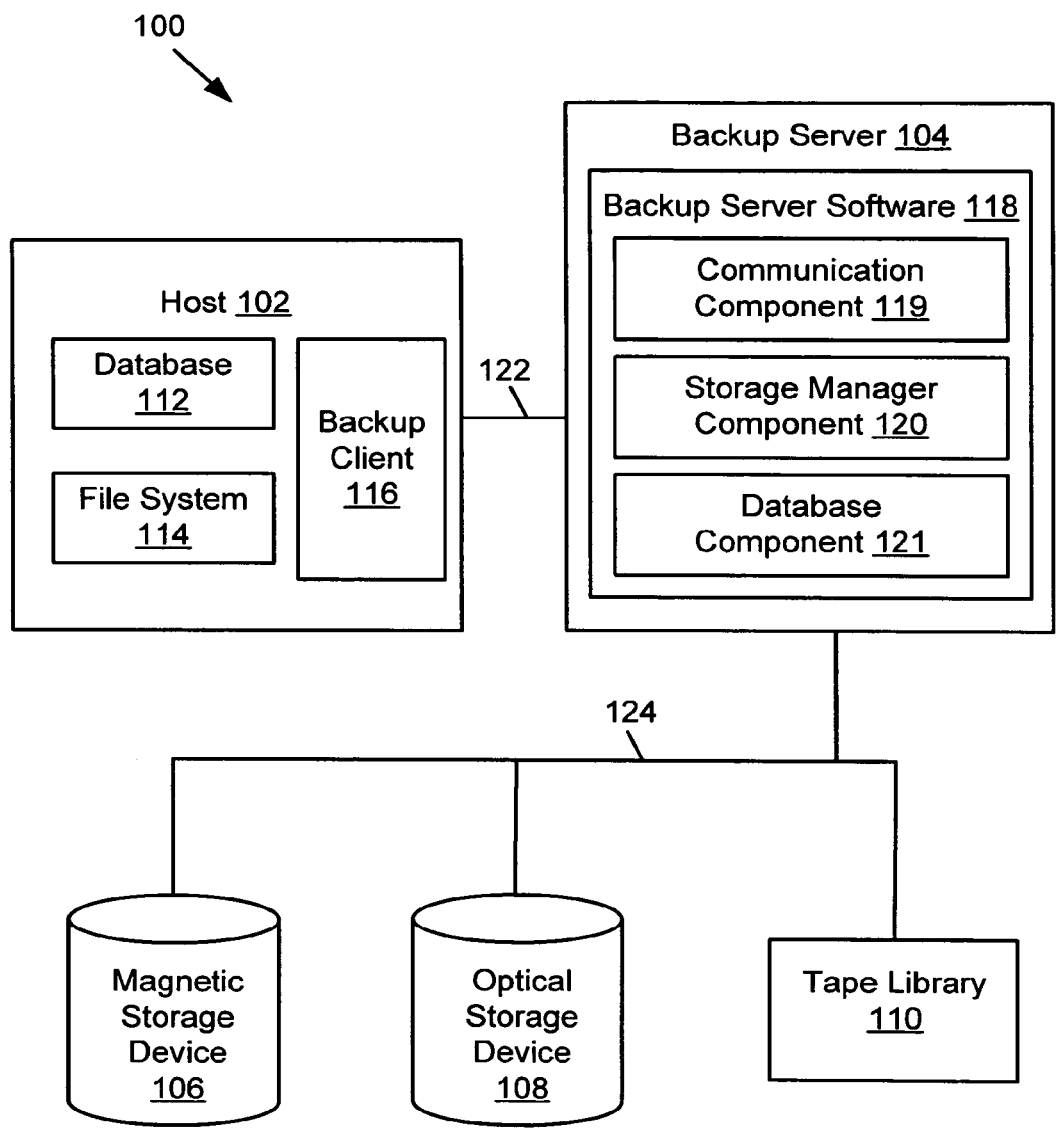
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system for backing up data. As an example, the computing system may be embodied by all, or portions of, the computing system 100 shown in FIG. 1. The computing system 100 may include one or more hosts 102, one or more backup servers 104, and one or more storage devices 106, 108, 110.

The host 102 may include a database 112, a file system 114, and a backup client 116. As an example, the host 102 may be an IBM xSeries model x445 server, or any other suitable computing device. The backup server 104 may include backup server software 118, which may include a communication component 119 (for communicating with the host 102), a storage manager component 120, and a database component 121. The database component may keep a record of all of the backups and restores that have occurred. As an example, IBM® TIVOLI® Storage Manager may be used for the backup server software. As another example, the backup server may be an IBM model P690 server, or any other suitable computing device. In an alternative embodiment, the backup server could be implemented on the host 102.

The host 102 may be coupled to the backup server 104 via a communications link 122. As an example, the communications link 122 may support TCP/IP or Fibre Channel protocols, and may be a Wide Area Network (WAN), a Local Area Network (LAN), a Storage Area Network (SAN), or any other suitable type of communications link or network. In another example, the host 102 and the backup server 104 could communicate via shared memory. In another example, a named pipe may be used in instances where the backup client and the backup server software are installed on the same machine. The backup server 104 may be coupled to the storage devices 106, 108, 110 with a communications link 124. As an example, the communications link 124 may support SCSI, iSCSI, or Fibre Channel protocols, and may be a WAN, LAN, SAN, or any other suitable type of communications link or network. As an example, the storage devices may include a magnetic storage device 106 (which for example may comprise one or more hard disk drives), an optical storage device 108 (which for example may comprise one or more CD or DVD drives), and a tape library storage device 110. As further examples, the magnetic storage device 106 may be an IBM model 2105 Enterprise Storage Server (ESS), and the tape library storage device 110 may be an IBM model 3594 tape library. However, the storage devices may be any suitable types of storage devices. For example, each of the storage devices could include one or more of the following: a CD-ROM, CD-R, CD-RW, WORM, DVD-R, DVD+R, DVD-RW, or DVD+RW drive, a magnetic storage "hard disk drive", a RAID array, a magnetic data storage diskette (such as a floppy disk), a magnetic tape data storage device, a digital optical tape data storage device, and/or a magneto-optical data storage device.

Figure 2:
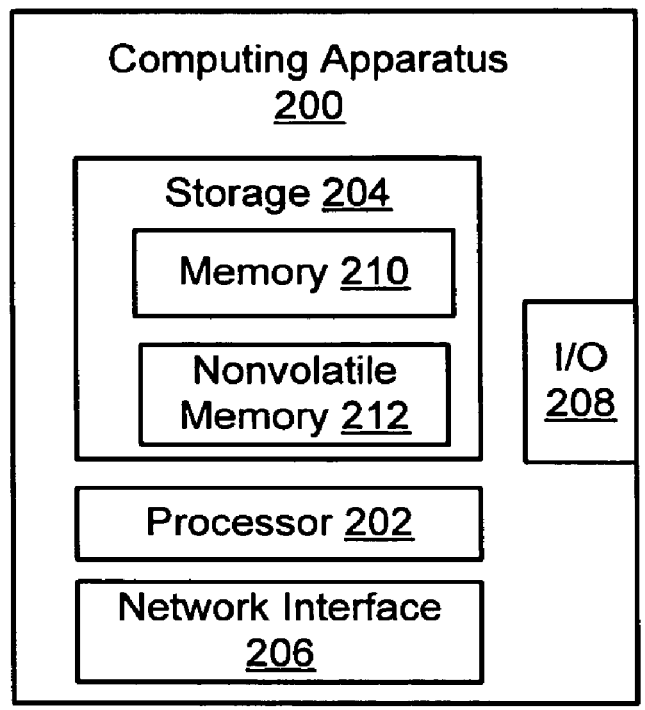
FIG. 2 is a block diagram of the hardware components and interconnections of a computing apparatus in accordance with an example of the invention.

An exemplary computing apparatus 200 is shown in FIG. 2. As an example, the host 102, the backup server 104, and any other computing devices in the computing system 100 could be implemented with an embodiment of the computing apparatus 200. The computing apparatus 200 includes a processor 202 (which may be called a processing device), and in some examples could have more than one processor 202. As an example, the processor may be a PowerPC RISC processor, available from International Business Machines Corporation, or a processor manufactured by Intel Corporation. The processor 202 may run any suitable operating system, for example, Windows 2000, AIX, Solaris™, Linux, UNIX, or HP-UX™. The computing apparatus 200 may be implemented on any suitable computer, for example a personal computer, a workstation, a server computer, a mainframe computer, or a supercomputer. The computing apparatus 200 also includes a storage 204, a network interface 206, and an input/output 208, which are all coupled to the processor 202. The storage 204 may include a primary memory 210, which for example, may be RAM, and a non volatile memory 212. The non-volatile memory 212 could be, for example, a hard disk drive, a drive for reading and writing from optical or magneto-optical media, a tape drive, non-volatile RAM (NVRAM), or any other suitable type of storage. The storage 204 may be used to store data and application programs and/or other programming instructions executed by the processor. The network interface 206 may provide access to any suitable wired or wireless network or communications link.

II. Operation

In addition to the hardware embodiments described above, other aspects of the invention concern a method for backing up data.

A. Signal-Bearing Media

In the context of FIGS. 1 and 2, the method aspects of the invention may be implemented, for example, by having the host 102 and/or the backup server 104 execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform operations for backing up data.

Figure 3:
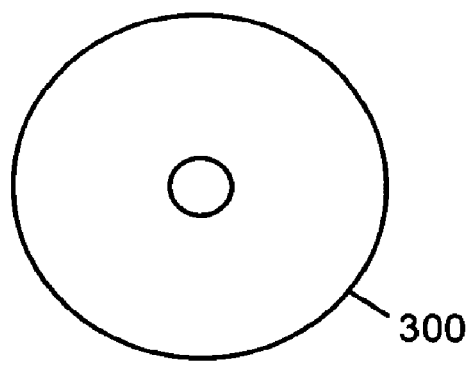
FIG. 3 is an example of a signal-bearing medium in accordance with an example of the invention.

This signal-bearing medium may comprise, for example, primary memory 210 and/or non-volatile memory 212. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard disk drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Alternatively, the signal bearing media may be implemented in hardware logic, for example, an integrated circuit chip, a Programmable Gate Array (PGA), or an Application Specific Integrated Circuit (ASIC). As an example, the machine-readable instructions may comprise software object code, compiled from a language such as "C++".

B. Overall Sequence of Operation

U.S. patent application Ser. No. 10/888,711, filed Jul. 9, 2004, titled "Method and System for Backing Up Data", is incorporated herein by reference. That application discloses creating a description of a backup that is a CIM object, and generating a packet that includes data and metadata, wherein the data and metadata are included in a CIM object. This allows different vendors' backup clients and backup servers (including backup management software) to communicate, and permits backup and restore operations to be performed using different vendor' backup clients and backup servers. Once this capability exists, as described herein for some examples of the present invention, it becomes possible for application programs, databases, (and file systems), to back themselves up by querying the backup infrastructure (without using a separate backup client, because the backup client technology can be embedded in the application). Thus, in accordance with examples of the present invention, application programs, databases, and file systems may function as their own backup clients, which can choose how and when to perform a backup. Further, the present invention advantageously permits a user to change a backup infrastructure, without affecting backup processes. For example, because the present invention permits an application or database to dynamically query a computing system to identify the backup types that are available, if a user adds support for snapshot to the backup infrastructure, the application or database could automatically detect the existence of the snapshot capability and begin using it.

For ease of explanation, but without any intended limitation, exemplary method aspects of the invention are described with reference to the computing system 100 described above and shown in FIG. 1. An example of the method aspect of the present invention is illustrated in FIGS. 4A-D, which show a sequence 400 for a method for backing up data, which may also be called a method for performing a backup. The sequence 400 for backing up data may also include restoring some or all of the data.

Figure 4A:
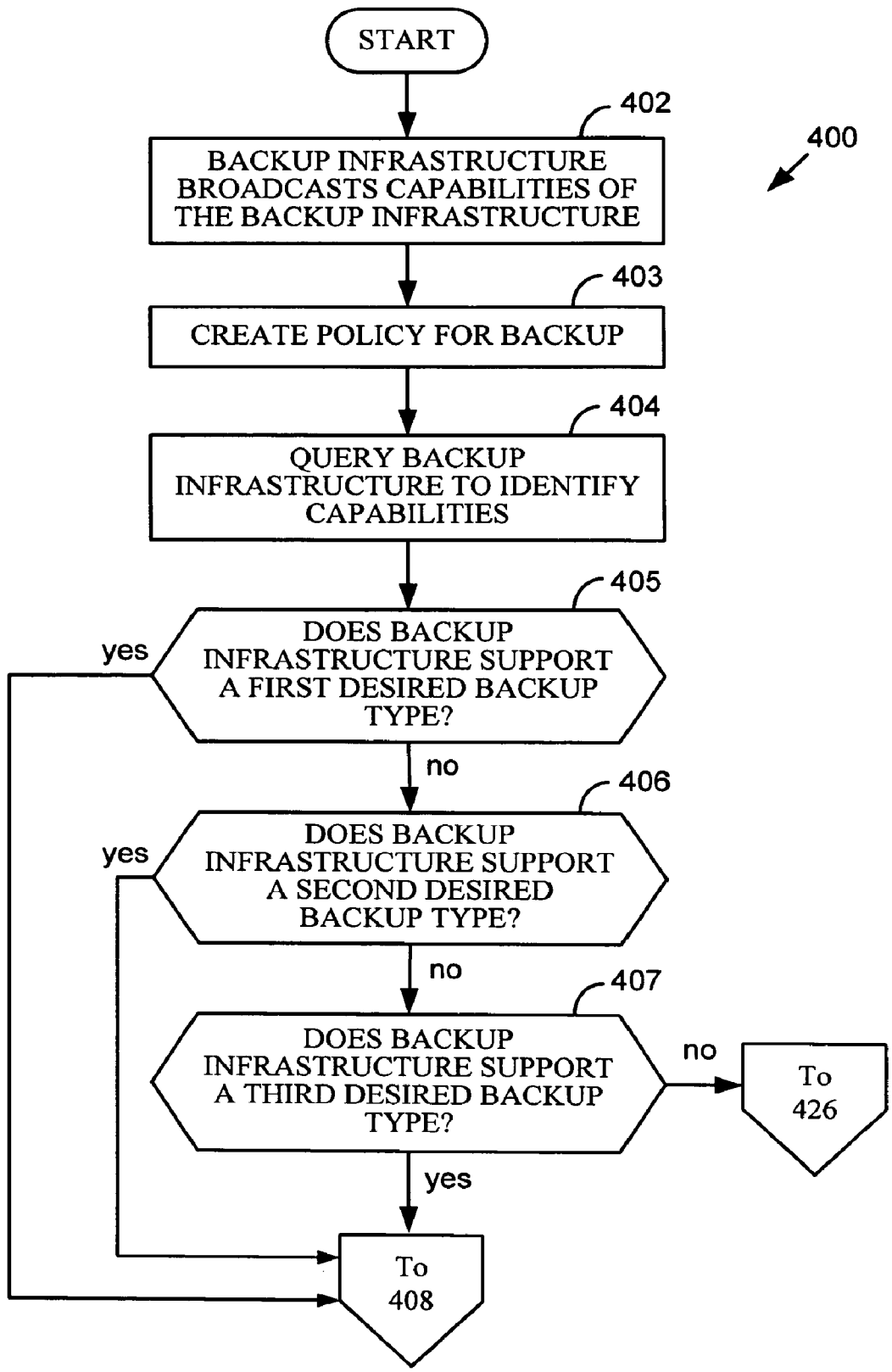
FIGS. 4A-4D are a flowchart of an operational sequence for backing up data in accordance with an example of the invention.

Operations of the sequence 400 may be performed by the host 102, and in some embodiments may be performed by the host 102 in conjunction with the backup server 104. Some examples of the invention may be performed by only the backup server 104. Referring to FIG. 4A, sequence 400 may include, and may begin with, operation 402, which comprises broadcasting (which may also be called advertising) the capabilities of the backup infrastructure. Operation 402 may be performed, for example, by the backup infrastructure. As an example, the backup infrastructure may include the backup server 104 and the backup server software 118, and in an alternative embodiment could include the backup client 116. In a typical embodiment the backup infrastructure includes principally the backup server 104 and its components. In some examples, the broadcasting operation 402 is performed by the backup server 104. The operation 402 of broadcasting the capabilities of the backup infrastructure may comprise using, for example, the Service Location Protocol (SLP), the Service Advertising Protocol (SAP), or a similar type of protocol.

Sequence 400 may also include operation 403, which comprises creating a policy for an application program or a database to back itself up. As an example, the application program may be an application such as Siebel CRM by Siebel Systems, or PeopleSoft SCM by PeopleSoft, Inc. As an example, the database may be DB2, which is available from IBM Corporation. The invention is not limited to backing up application programs and/or databases. As an example, a backup/restore agent, such as backup client 116, may be configured to automatically backup a file system based on, for example, business requirements, and the automatic backup may be enforced with a policy.

Sequence 400 may also include operation 404, which comprises querying a backup infrastructure to ascertain backup capabilities of the backup infrastructure, using, for example, the Service Location Protocol (SLP), the Service Advertising Protocol (SAP), or a similar type of protocol. As an example, an application program or database running on the host 102 may query the backup server 104 to determine what backup capabilities the backup server 104 offers. In another example, the querying operation 404 may be performed by the backup client 116. Operation 404 may further comprise ascertaining restore capabilities of the backup infrastructure. Snapshot, and traditional restore operations, are examples of restore capabilities that may exist.

Sequence 400 may also include operation 405, which comprises determining if the backup infrastructure supports a first desired backup type. If the backup infrastructure supports the first desired backup type, then the sequence may continue with operation 408 (described below). If the backup infrastructure does not support the first desired backup type, then sequence 400 may also include operation 406, which comprises determining if the backup infrastructure supports a second desired backup type. If the backup infrastructure supports the second desired backup type, then the sequence may continue with operation 408 (described below). If the backup infrastructure does not support the second desired backup type, then sequence 400 may also include operation 407, which comprises determining if the backup infrastructure supports a third desired backup type. If the backup infrastructure supports the third desired backup type, then the sequence may continue with operation 408 (described below). If the backup infrastructure does not support the third desired backup type, then sequence 400 may continue with operation 420 (described below).

This procedure may be carried out with fewer than, or more than, three desired backup types. Generally, an application program or database, (or backup client) may have a hierarchy of desired backup types, which the application program, database, or backup client ranks as best (first desired), second best (second desired), third best (third desired), etc. The application program, database, or backup client may choose the highest ranked backup type that is provided by the backup infrastructure. As an example, the application program, database, or backup client may (1) determine which backup type is optimal (the first desired backup type), based on policy, and (2) find out if the backup infrastructure supports the first desired backup type. If the first desired backup type is supported, then it is selected. If the first desired backup type is not supported, then the second desired backup type is selected if it is supported. If the second desired backup type is not supported, then the third desired backup type is selected if it is supported. Each type of data (for example, database, application, or files) might have a different preferred type of backup and hierarchy of preferred backups. For example, an extremely important database may prefer snapshot. If snapshot is not available, then the database might choose third party, and then serverless. An application program may have a different hierarchy of preferred backup types.

Operations 405, 406, and 407 may be performed, for example, by an application program or a database. As another example, operations 405, 406, and 407 may be performed by the backup client 116. A desired backup type typically may include, for example, one or more of the following backup types: snapshot, LAN-free, serverless, and third party. A particular backup infrastructure need not provide any, all, or any specific combinations, of the backup types snapshot, LAN-free, serverless, and third party. Also, because examples of the invention may be practiced with any desired backup type, the desired backup type could be some other backup type and could even be a backup type that is developed in the future. More exhaustively, different types of backups may include, for example, full, incremental, differential, copy, LAN-free, serverless, third party, and snapshot. Full, incremental, differential, and copy are primarily database/client side types, so the backup infrastructure may not necessarily broadcast (advertise) that these types are supported by the backup infrastructure. However, the backup infrastructure may broadcast (advertise) that it contains technologies that help support the database/client side types, such as for example, differential backup, to provide information so the backup client 116 may choose the service that best supports the desired type of backup.

If in operation 405, 406, or 407 it is determined that the backup infrastructure supports a desired backup type, the sequence 400 may also include performing a backup of data using the (selected) desired backup type. Thus, the desired backup type may be used to backup data associated with an application program, or data associated with a database, or in alternative embodiment, data associated with a file system. Performing a backup of data using the desired backup type may comprise one or more of operations 408, 409, 410, 412,

414, 415, and 416, which, for example, may be performed by an application program or database, or by the backup client 116.

Figure 4B:
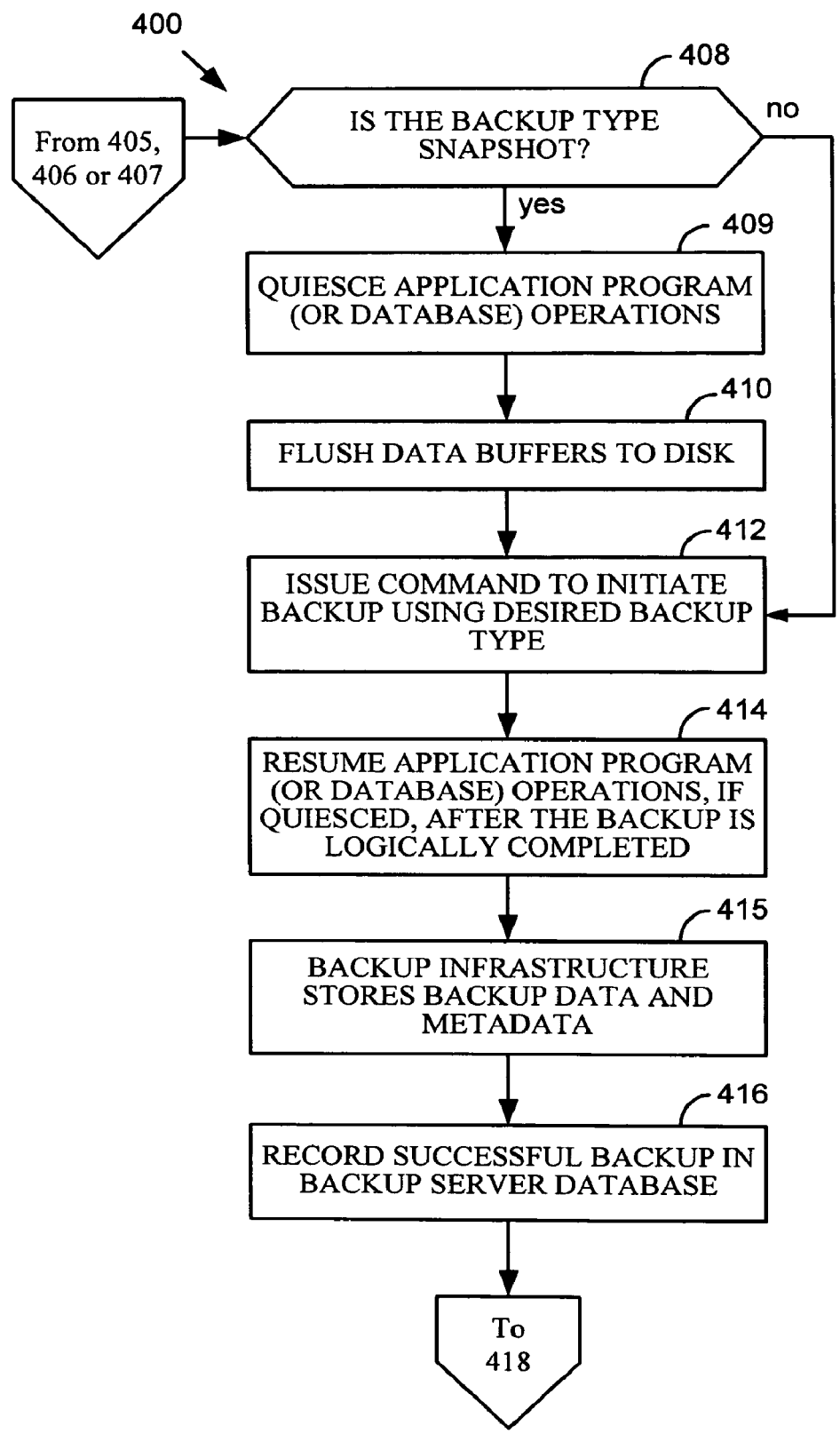

Referring to FIG. 4B, operation 408 comprises determining if the backup type is snapshot. If the backup type is snapshot, then the sequence 400 may include operation 409, which comprises quiescing operations of the application program (or database), which may also be described as halting the application program (or database). In an alternative embodiment, operation 409 may comprise halting operations of a file system. If the backup type is snapshot, the sequence 400 may also include operation 410, which comprises flushing data buffers to disk. In alternative embodiments, operations 409 and 410 may be performed in instances where the backup type is not snapshot. Whether or not the backup type is snapshot, the sequence 400 may include operation 412. Operation 412 comprises issuing a command, which, for example, may be a CIM command, to backup the data using the desired backup type (which may be called a command to initiate the backup). As an example, the command may be received by the backup server 104. The sequence 400 may also include operation 414, which comprises resuming operations of the application program (or database, or file system), after the backup is logically completed, if the operations have been quiesced. With some examples of the invention, an application program or database has the capability to operate as a backup client, and to quiesce itself and invoke a backup, without using a separate backup client to perform the backup.

Operation 415 comprises storing backup data and metadata when the backup is complete. The backup server may store the backup data and metadata as CIM objects, or in any other suitable format. The backup metadata can be used to restore data. As an example, a first copy of the backup metadata may be associated with the application program (or database), and a second copy of the backup metadata may be associated with a backup server. Sequence 400 may also include operation 416, which comprises recording the occurrence of a successful backup in a backup server database.

As an example, there are 3 different general types of data that may be backed up: application data (such as PeopleSoft data), database data (such as DB2 data), and filesystem data (such as the files on a C:\ drive). In some embodiments, software for implementing examples of the invention may be embedded in software that provides the data to be backed up (for example, in an application, database, or filesystem), or the software for implementing examples of the invention may reside in a separate backup/restore client. In some examples wherein the data that is backed up is associated with an application program, the querying 404 and determining operations 405, 406, 407 are performed by the application program, and the backup is performed by the application program. Similarly in some examples wherein the data that is backed up is associated with a database, the querying 404 and determining operations 405, 406, 407 are performed by the database, and the backup is performed by the database. Likewise, in some examples wherein the data that is backed up is associated with a file system, the querying 404 and determining operations 405, 406, 407 are performed by the file system, and the backup is performed by the file system.

Figure 4C:
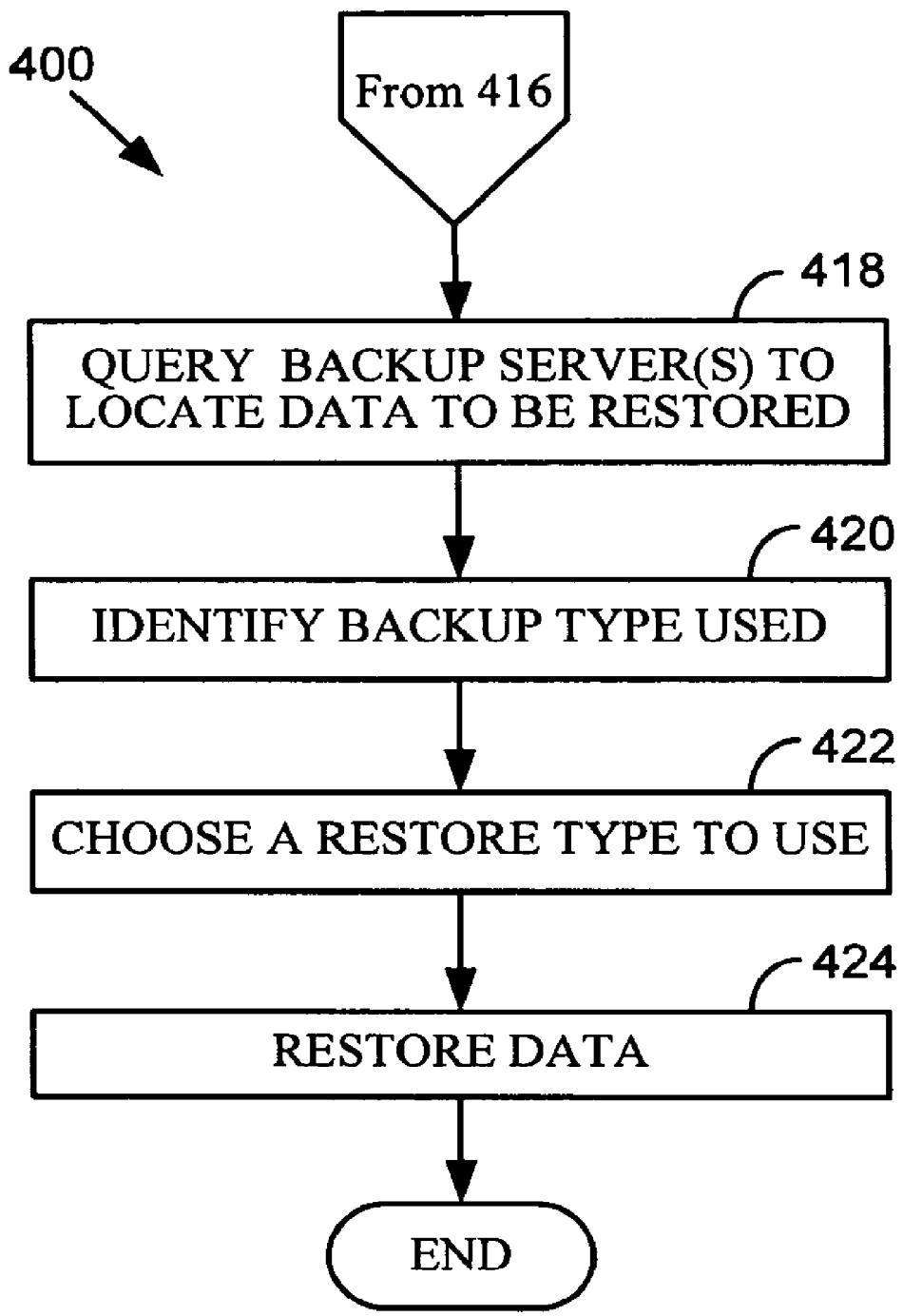

Referring to FIG. 4C, if the need arises to restore some or all of the backed up data, the sequence 400 may include operation 418, which comprises querying at least one backup server to identify a backup server that contains backup data to be restored (to locate the data to be restored). The sequence 400 may also include operation 420, which comprises identifying the backup type that was used for backing up the data. Further, the sequence 400 may also include operation 422, which comprises choosing a restore type to use. Although not required, in many cases, the restore type will be the same as the backup type. For example, if the data was backed up using snapshot, the data may be restored by performing a snapshot in the reverse direction. Alternatively, if data has been backed up using snapshot, traditional restore techniques may be used to restore the data. The sequence 400 may also include operation 424, which comprises restoring the data.

Figure 4D:
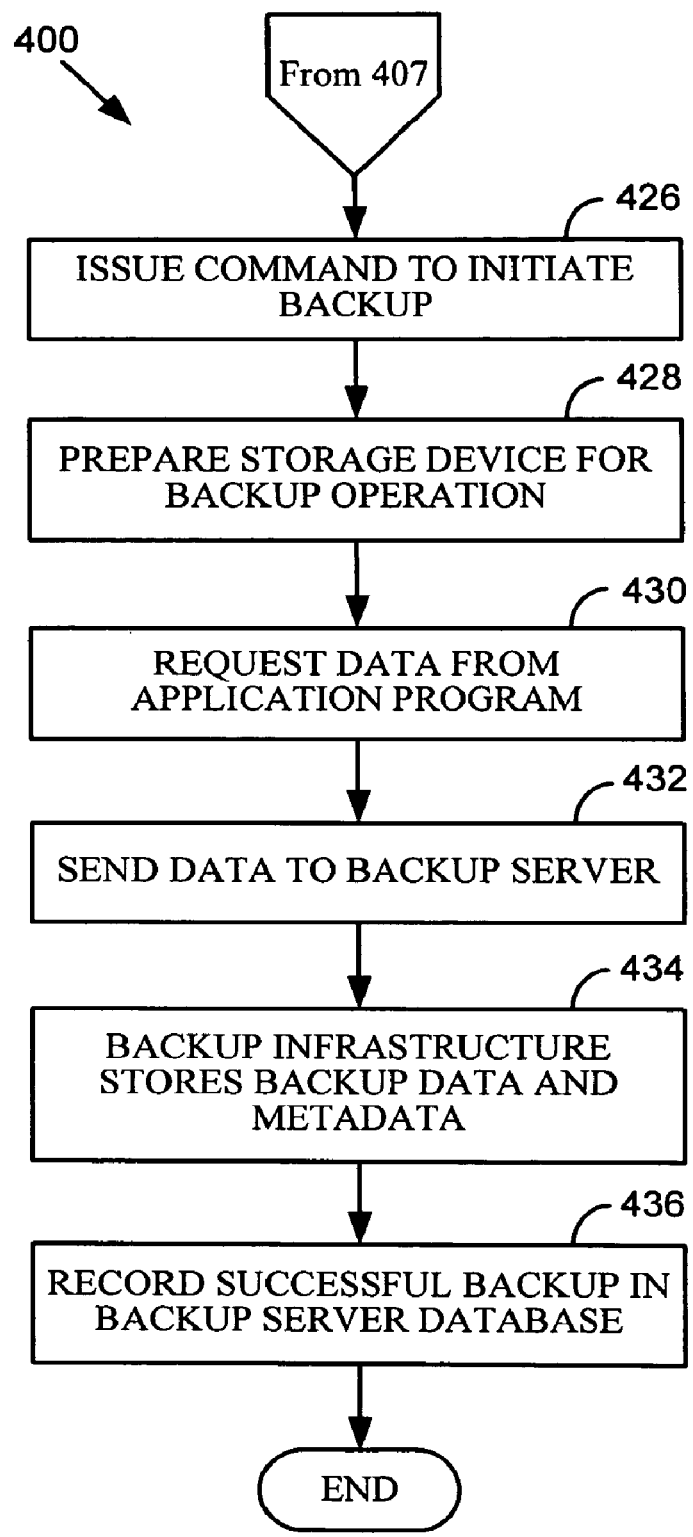

If in operations 405, 406, and 407 it is determined that the backup infrastructure does not support a desired backup type, then, referring to FIG. 4D, the sequence 400 may also include one or more of operations 426, 428, 430, 432, 434, and 436. Operation 426 comprises issuing a command to initiate a backup. As an example, the command may be an inband or out of band CIM command. Operation 428 comprises preparing a storage device for a backup operation. As an example, operation 428 may be performed by the backup server 104. The storage device may be, for example, a tape drive, a hard disk drive, an optical storage drive, or any other suitable type of storage device. Operation 430 comprises requesting data from an application program (or a database). In an alternative embodiment, operation 430 may comprise requesting data from a file system. As an example, operation 430 may be performed by the backup server 104. Operation 432 comprises sending data from the application program (or database), or in an alternative embodiment, data from a file system, to the backup server 104. Operation 434 comprises storing backup data and metadata, when the backup is complete. The backup server may store the backup data and metadata as CIM objects, or in any other suitable format. Both an application program (or database) and a backup server may retain a respective record of the backup. Sequence 400 may also include operation 436, which comprises recording the occurrence of a successful backup in a backup server database. If the need arises to restore some or all of the backed up data, then one or more of operations 418, 420, 422, and 424, which are discussed above, may be performed to restore the data.

As discussed above, some examples of the invention may be implemented as a database that has the capability to back itself up by querying a backup infrastructure. As an example, a user may simply create a policy instructing the database to back itself up every night at 12:00 a.m. Optionally, the user may also specify availability requirements, recovery time objective (RTO) requirements, and/or recovery point objective (RPO) requirements. The database may then back itself up using the most appropriate methods for the database (which may be determined by the database based on business requirements, as implemented by a backup policy). If the need to restore backed up data arises, the administrator may select a desired point in time to restore to. The database may query one or more backup servers to identify a backup server that contains the backed up data to be restored, and then may invoke the restore process.

The following is an example of an implementation of the invention:

1. A user creates a policy for DB2 to back itself up each night at 12:00 a.m.

2. A hierarchy of desired backup types is determined by the database. For example, snapshot may be the first choice, LAN-free may be the second choice, and performing a traditional backup may be the third choice.

3. At 12:00 a.m., DB2 queries the capabilities of the backup infrastructure. The backup infrastructure broadcasts (advertises) these capabilities using the Service Location Protocol (SLP).

4. If the backup infrastructure supports snapshot operations, the following occurs:
   a. DB2 quiesces database operations, and suspends writes.
   b. DB2 issues an inband CIM command to initiate the snapshot.
   c. After the snapshot is logically complete, DB2 resumes database operations.
5. If the backup infrastructure does not support snapshots, DB2 inquires about LAN-free copy capability, which is used if available.
6. If LAN-free (mentioned in number 5 above) is not available, DB2 may default to a traditional backup:
   a. DB2 issues an inband CIM command to initiate the backup.
   b. The backup server prepares a tape drive for a backup operation.
   c. The backup server requests data from DB2.
   d. DB2 sends data to the backup server.
7. When the backup is complete, both DB2 and the backup server store the backup metadata as CIM objects, which can then be used for a restore operation.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer implemented method in a digital processing apparatus to perform operations for backing up data, the operations comprising:
   querying a backup infrastructure to ascertain backup capabilities of the backup infrastructure;
   performing a backup of data using the desired backup type in response to determining that the backup infrastructure supports a desired backup type;
   wherein the desired backup type is selected from the group consisting of snapshot, LANfree, serverless, and third party.

2. A computer implemented method in a digital processing apparatus to perform operations for backing up data, the operations comprising:
   querying a backup infrastructure to ascertain backup capabilities of the backup infrastructure;
   performing a backup of data using a first desired backup type in response to determining that the first desired backup type is supported;
   performing the backup of the data using a second backup type in response to determining that the second desired backup type is supported;
   wherein the desired backup type is selected from the group consisting of snapshot, LANfree, serverless, and third party.

3. A computer implemented method in a digital processing apparatus to perform operations for backing up data, the operations comprising:
   querying a backup infrastructure to ascertain backup capabilities of the backup infrastructure;
   performing a backup of data using a first desired backup typein response to determining the first desired backup type is supported
   performing the backup of the data using a second desired backup type in response to determining that the second desired backup type is supported;
   performing the backup of the data using a third desired backup type in response to determining that the third desired backup type is supported;
   wherein the desired backup type is selected from the group consisting of snapshot, LANfree, serverless, and third party.

* * * * *